March 12, 1929.  W. S. VALMORE  1,704,848
THERMOSTATIC RADIATOR TRAP
Filed Jan. 13, 1927
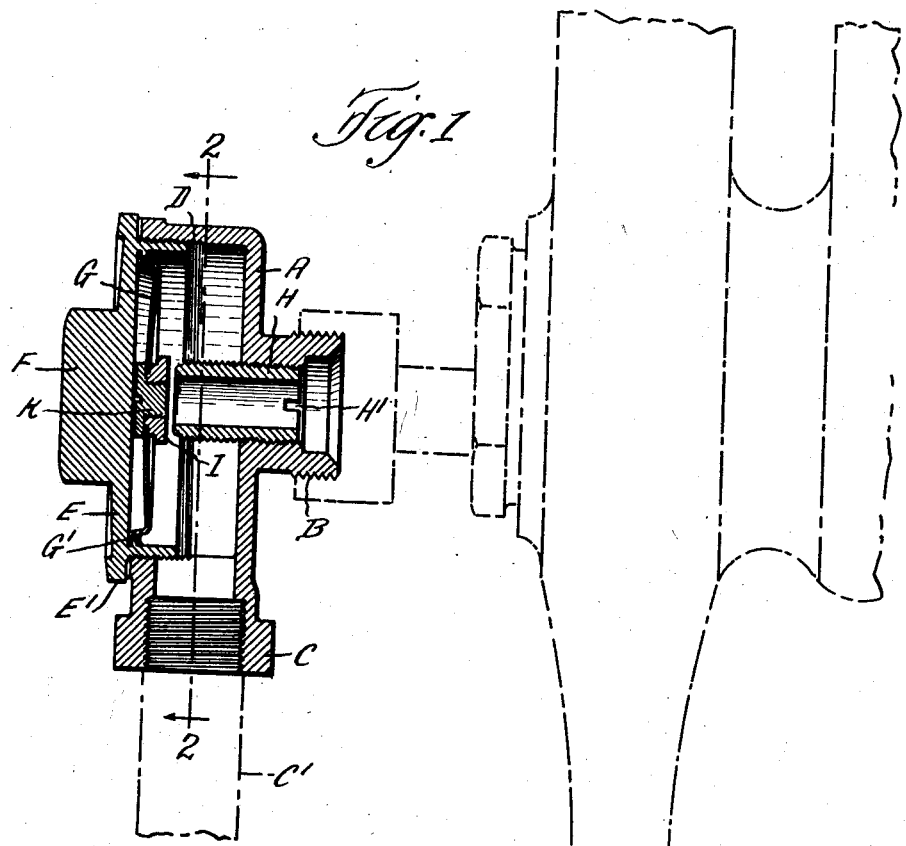
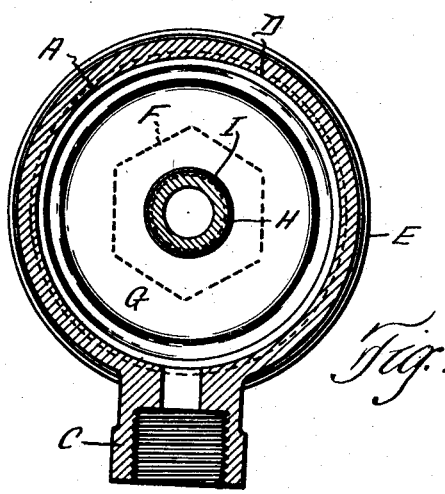
INVENTOR
William S. Valmore
By
Hull Brock & West
Attys.

Patented Mar. 12, 1929.

1,704,848

UNITED STATES PATENT OFFICE.

WILLIAM S. VALMORE, OF MANSFIELD, OHIO.

THERMOSTATIC RADIATOR TRAP.

Application filed January 13, 1927. Serial No. 160,925.

This invention relates to improvements in traps for radiators intended for use in connection with heating systems in which it is desired to vent condensation from the mains, returns, or other portion of the system in which steam is used.

My invention has for its object to provide a novel and efficient trap for automatically permitting the escape of water from radiators and preventing the escape of steam therefrom.

Common forms of heating systems employ an air line which communicates with each radiator in the system through a suitable automatic trap; the purpose of the air line being to carry from the radiators to a discharge point the air and such water as may condense in the radiators, or as may leak through the valves. The water which passes through the automatic trap and the steam which enters the trap both contain more or less dirt or grit which collects upon trap seats and interferes with the successful operation of the trap. The traps become dirty and it is necessary to clean them in order to bring them back to their normal working conditions; but such traps heretofore have required the services of a skilled mechanic to open the traps to clean them and then to readjust them properly and the advantages gained by cleaning the traps may be more than offset by the disadvantages following from improper adjustment.

An object of my invention is to provide an air trap of the type to which I have referred which may be cleaned without requiring the services of a skilled mechanic and without danger of disarrangement of the adjustment of the parts.

Another object of my invention is to provide a trap which will allow the condensation to freely escape from the system past the trap, but which will close and positively prevent the escape of steam when the trap has reached a certain temperature.

Another object of my invention is to provide an automatic trap of the class described which comprises comparatively few parts and which is simple and rigid in construction, easily assembled and disassembled and which is well adapted for quantity production at comparatively low cost.

The various features of novelty whereby my invention is characterized are hereinafter pointed out with particularity in the claim; and a full understanding of my invention and its objects and advantages may be had by reference to the accompanying drawing in which Fig. 1 is a transverse sectional view of a trap constructed in accordance with my invention showing the same attached to a radiator, which is shown in dotted lines; and Fig. 2 is a sectional view on the line 2—2 of Fig. 1 looking in the direction of the arrows.

Referring to the drawings, A represents a substantially cylindrical trap or casing having a laterally extending threaded nipple B adapted to be connected with a radiator, and a downwardly extending interiorly threaded nipple C adapted for connection with a drain pipe C'. The open end of the casing is interiorly threaded as shown at D and is adapted to receive a threaded cap or cover E provided with a hexagonal boss F adapted to receive a wrench. The cover E is provided with an overhanging peripheral flange E' and a depending annular exteriorly threaded skirt adapted to engage with the threads D on the casing. Secured within the cover E is a flexible diaphragm G substantially in the form of a shallow cup and having a peripheral flange G' thereon as shown. The diaphragm is placed within the cover and, if desired lugs may be cut out of the wall of the skirt and bent down over the peripheral flange G' of the diaphragm at one or more points. The annular depression between the side wall of the diaphragm and the wall of the depending skirt is filled with solder to hermetically seal the diaphragm to the cover. Adjustably secured within the inlet opening is a bushing H, the inner end of which is formed to provide a valve seat. The bushing H is provided with a tool receiving portion H' whereby the position of the bushing with respect to the trap member may be adjusted. In this connection it should be noted that the trap cover and diaphragm may be removed and cleaned or replaced without disturbing the adjustment of the bushing. Secured to the diaphragm G in axial alignment with the bushing is a valve member I which is attached to the diaphragm by means of a screw plug K. The thermostatic disk or diaphragm G is made of a metal having a high coefficient of expansion and which, due to its shape, is adapted to flex inwardly when heated, but normally maintains the position shown in Fig. 1 with the valve I open and allows water in the radiator to enter the inlet and pass out through the outlet C to a suitable drain pipe C'. When all of the water has passed through the casing and steam begins to enter through the inlet opening the same will heat the thermostatic diaphragm G and cause the same to expand and to flex to the right as seen in Fig. 1 to seat the valve member I on the inner end of the bushing and positively prevent the escape of steam through the trap chamber. When the radiator is turned off and is cooled sufficiently, the diaphragm also is cooled and assumes the position shown in Fig. 1.

Attention is called to the fact that the diaphragm is carried entirely by the cover and may be removed from the casing along with the cover and cleaned should the same become necessary. In manufacturing the device the diaphragm is secured to the cover member before the same has been placed on the casing. This construction has the advantage that the diaphragm may be mounted upon the cover under good working conditions and the cover secured in place in the casing without danger of injuring the joint between it and the diaphragm and without injury to the threads.

Operation.

Assuming that the trap is connected in the return line of a heating system with the nipple B connected to a radiator which is cold and the nipple C connected with a drain C'; when steam is turned on any water which may be in the radiator passes ahead of the steam into the casing and out through the drain pipe C'. When the steam reaches the trap the diaphragm becomes heated and expands which thereby causes the diaphragm to flex inwardly to move the valve I against its seat to close the inlet opening and to prevent escape of steam. When the steam is shut off and the radiator cools, the diaphragm also cools and flexes outwardly and assumes its original position as shown in Fig. 1. The diaphragm is so constructed that at all temperatures below a certain point it assumes the position shown in Fig. 1 and when the temperature goes above this point it flexes to right as seen in Fig. 1 to close the inlet opening.

While I have described and illustrated with particularity only a single form of my invention, I do not desire to be limited to the specific details so illustrated and described but intend covering all constructions and arrangements which fall within the terms and scope of the appended claim.

It will now be clear that I have provided a device which will accomplish the objects of the invention as hereinbefore stated.

Having thus described my invention, what I claim is:

In an automatic trap of the character described, a casing having an inlet and an outlet, a valve seat within said casing, a cover for said casing having an annular threaded skirt adapted for threaded engagement with the casing, a flexible thermostatic diaphragm carried by said cover, said diaphragm being in the form of a shallow cup and having an annular peripheral flange adapted to be secured to said cup, lugs cut out of the wall of said skirt and bent down over said peripheral flange, the annular depression between the side wall of said diaphragm and the said depending skirt being substantially filled with solder, the said diaphragm being to shaped and having such a coefficient of expansion as to flex inwardly or outwardly in accordance with changes in temperature within said casing, a valve member carried by said diaphragm in axial alignment with said valve seat and adapted to move with said diaphragm to open or close said valve.

In testimony whereof, I hereunto affix my signature.

WILLIAM S. VALMORE.